United States Patent
Moore et al.

(10) Patent No.: US 6,349,404 B1
(45) Date of Patent: Feb. 19, 2002

(54) OBJECT-ORIENTED REPOSITORY, A SYSTEM AND METHOD FOR REUSING EXISTING HOST-BASED APPLICATION ASSETS FOR THE DEVELOPMENT OF BUSINESS-CENTRIC APPLICATIONS

(75) Inventors: Jeffrey Allen Moore, Mission Viejo; Charles Eugene Steel, La Habra; Joseph Peter Stefaniak, San Clemente, all of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/328,125

(22) Filed: Jun. 8, 1999

(51) Int. Cl.[7] .................................................. G06F 9/44
(52) U.S. Cl. .............................. 717/1; 717/3; 707/104; 707/103 Y
(58) Field of Search ........................ 717/1, 3; 707/104, 707/103 Y, 103 Z

(56) References Cited

U.S. PATENT DOCUMENTS

| | | | |
|---|---|---|---|
| 5,325,533 A | * 6/1994 | McInerney et al. ............. | 717/1 |
| 5,644,764 A | * 7/1997 | Johnson et al. ............. | 707/103 |
| 5,815,149 A | * 9/1998 | Mutschler, III et al. .... | 345/335 |
| 5,940,075 A | * 8/1999 | Mutschler, III et al. .... | 345/335 |
| 6,029,174 A | * 2/2000 | Sprenger et al. ............ | 707/103 |
| 6,167,563 A | * 12/2000 | Fontana et al. ................ | 717/1 |
| 6,167,564 A | * 12/2000 | Fontana et al. ................ | 717/1 |
| 6,170,081 B1 | * 1/2001 | Fontana et al. ................ | 717/1 |

OTHER PUBLICATIONS

Petro et al., "Model–Based Reuse Repositories–Concepts and Experience," IEEE Proceedings, Seventh International Workshop on Computer–Aided Software Engineering, Jul. 10–14, 1995, pp. 60–69.*

* cited by examiner

Primary Examiner—Tuan Q. Dam
(74) Attorney, Agent, or Firm—Alfred W. Kozak; Mark T. Starr; Lise A. Rode

(57) ABSTRACT

A computer system is disclosed which has data contained in a plurality of objects described by a model representing host-based application assets. The model is use in the development of business-centric applications. The computer system comprises a data storage means for storing said plurality of objects in the computer system and means for populating the plurality of objects with a specification for a particular host-based asset. The model comprises a hierarchy of classes defined for the computer system, and includes in part a user class representing properties unique to a particular user; a user access application class representing a privilege level that a user has to a particular application; an application class encapsulating a list of host-based assets and a list of users who have access to those assets; a common file class encapsulating those hostbased assets that belong to an application type; and, a database file class encapsulating a generalization of all persistent host-related data.

18 Claims, 9 Drawing Sheets

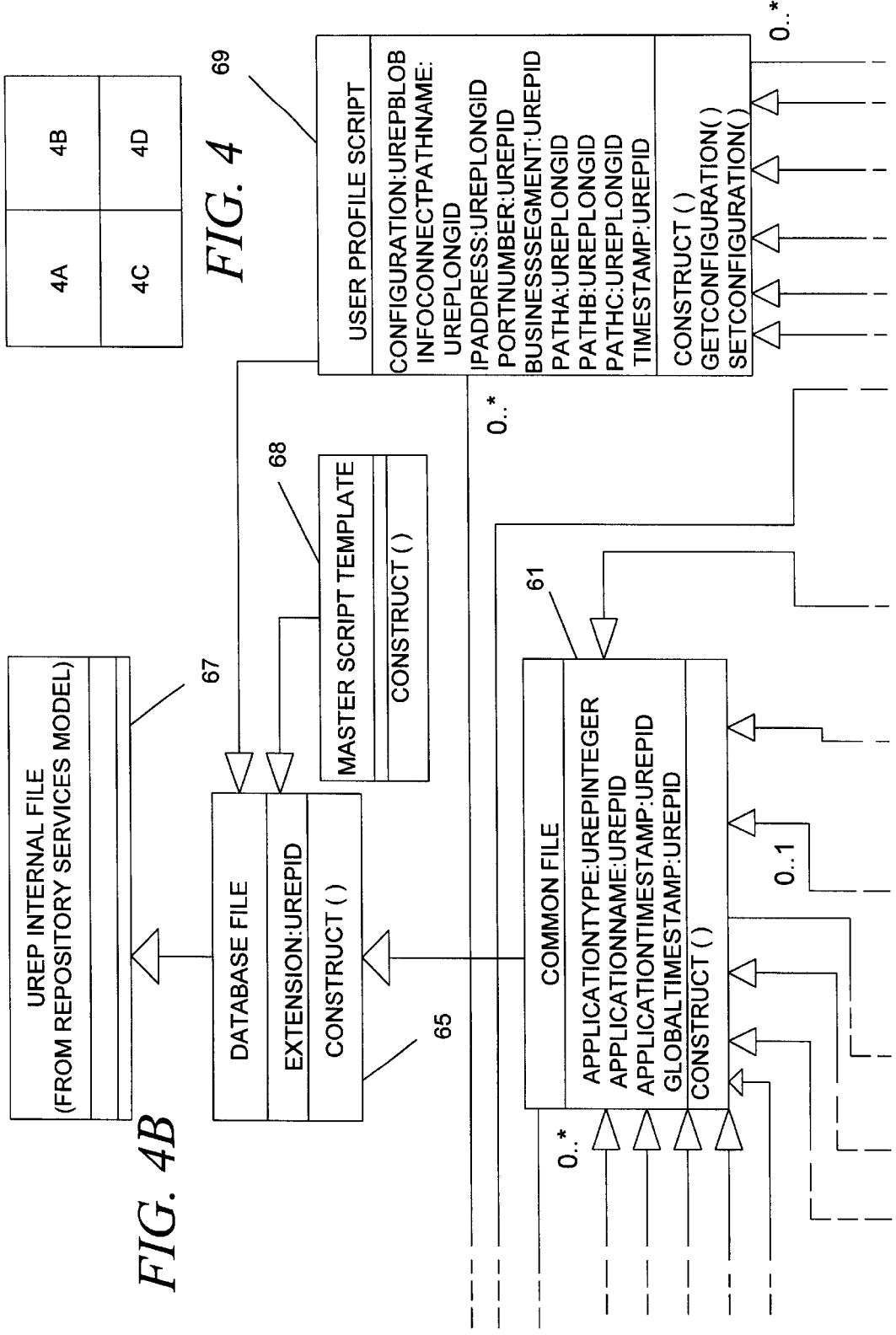

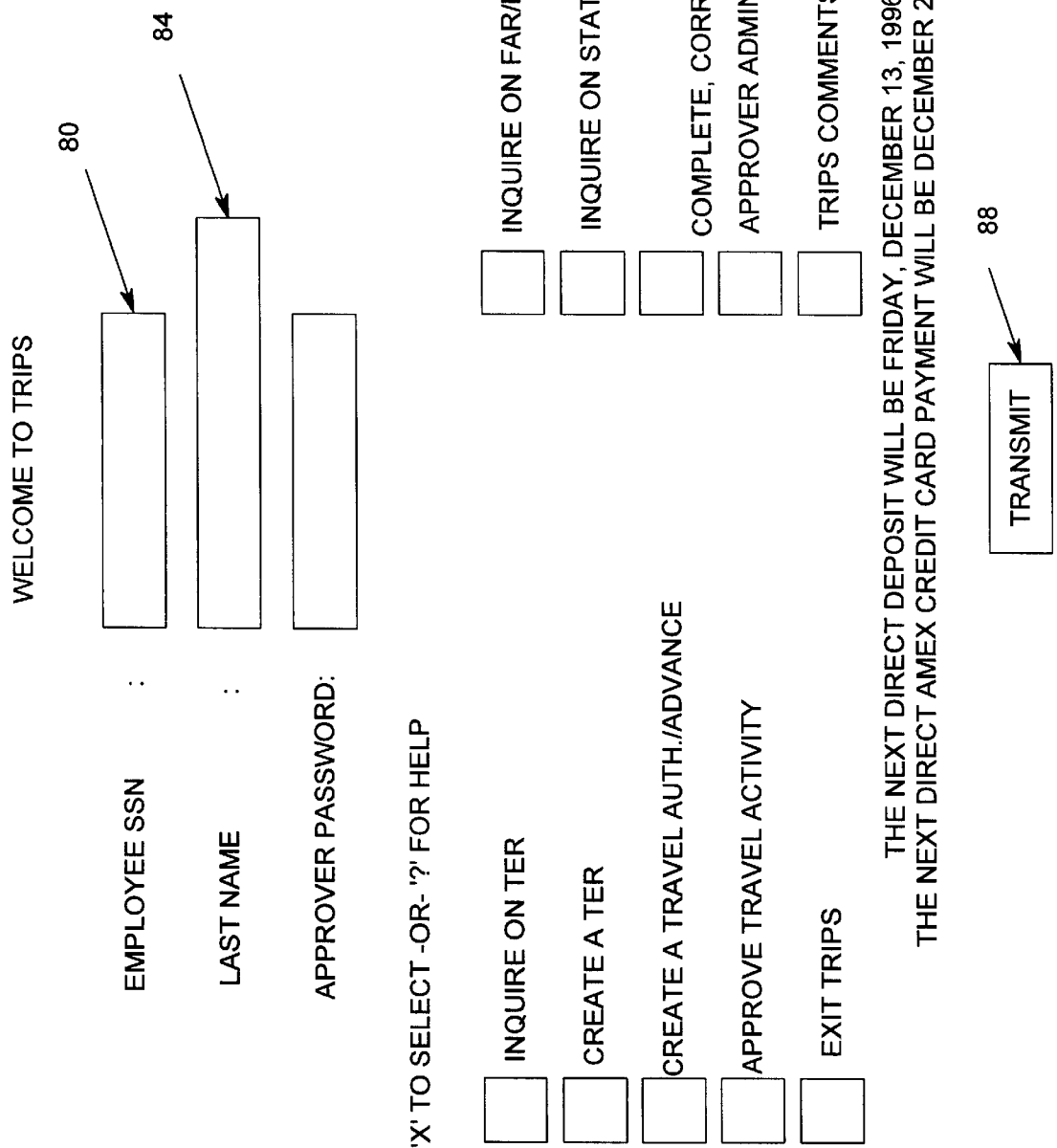

OBJECT-ORIENTED REPOSITORY, A SYSTEM AND METHOD FOR REUSING EXISTING HOST-BASED APPLICATION ASSETS FOR THE DEVELOPMENT OF BUSINESS-CENTRIC APPLICATIONS

CROSS REFERENCE TO RELATED APPLICATIONS

This application relates to the following co-pending application, assigned to the same assignee hereof, the texts of which is incorporated herein by reference.

U.S. Ser. No. 09/328,126, entitled A SYSTEM AND METHOD FOR DISCOVERING AND DEFINING HOST-BASED APPLICATION ASSETS FOR THE DEVELOPMENT OF BUSINESS-CENTRIC SOFTWARE COMPONENTS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of computer systems for developing business applications; and, in particular, it relates to a system and computer-implemented method in a repository for discovering, defining and cataloging legacy applications for use in the generation of technology independent business-centric applications.

BACKGROUND OF THE INVENTION

The software industry has seen great advances in distributed computing from both a client/server and software modeling perspective. The move towards network-centric computing, using the client/server architecture of the Internet, coupled with new software tools and component-based models, equip today's software developer with a distributed, object-oriented, infrastructure that affords ease of access and manipulation of business data.

In the early nineties, as client-server computing emerged; more advanced software solutions introduced more intelligent links among clients and servers. Although it represents an improvement over earlier models, client-server computing still suffers from a number of drawbacks. For example, since information carried between clients and servers is usually transmitted over a proprietary protocol, each user tends to implement a closed solution, i.e., a solution that works only for the product of that user.

Earlier disclosed methods and systems for performing similar functions to that of the present invention are set forth in one or more of the following: U.S. Pat. No. 5,815,149, entitled METHOD FOR GENERATING CODE FOR MODIFYING EVENT ROUTINES FOR CONTROLS ON A FORM; patent application Ser. No. 08/941,436, now U.S. Pat. No. 5,974,430, entitled A METHOD FOR DYNAMICALLY EMBEDDING OBJECTS STORED IN A WEB SERVER WITHIN HTML FOR DISPLAY BY A BROWSER; patent application Ser. No. 08/941,438, now U.S. Pat. No. 6,157,936, entitled METHOD FOR EXTENDING THE HYPERTEXT MARKUP LANGUAGE (HTML) TO SUPPORT A GRAPHICAL USER INTERFACE CONTROL PRESENTATION; patent application Ser. No. 09/183,204, now U.S. Pat. No. 6,223,180, entitled A SYSTEM AND COMPUTER IMPLEMENTED METHOD FOR TRANSFORMING HOST-BASED SCREEN APPLICATIONS INTO COMPONENTS USEFUL IN DEVELOPING INTEGRATED BUSINESS-CENTRIC APPLICATIONS; and, patent application Ser. No. 09/183,203, now U.S. Pat. No. 6,253,244, entitled A SYSTEM AND COMPUTER IMPLEMENTED METHOD FOR PROVIDING ACCESS TO HOSTBASED SCREEN APPLICATIONS USING BUSINESS-CENTRIC SOFTWARE COMPONENTS, all of which are assigned to the assignee hereof.

In the current scenario, distributed component-based development and enabling solutions are changing the way information is discovered, built, managed and delivered. Organizations are investing in component-based technologies because they cannot afford to ignore the reductions in costs that the new technology offers.

A reduction in the overall costs is just one benefit. Other benefits include access to larger amounts of enterprise information for connecting the organization, delivering solutions and keeping pace with end-user demands, and being able to take advantage of ever changing technology more effectively. Effective business processes require information, and the objective for the Information System (IS) organizations is to ensure that the required information is available when it is needed.

A system is needed for delivering information to large numbers of end-users, which include iterative processes of building and deploying components. Such a system is appealing when compared with the alternative of configuring every end-user system with application-specific client applications.

SUMMARY OF THE INVENTION

In accordance with the present invention a system is provided that reduces overall costs while efficiently accessing large amounts of enterprise information for connecting the organization, delivering solutions and keeping pace with end-user demands for ever-changing technology.

An advantage of the present invention is the use of component-based technology, which embraces the entire realm of an organization's information infrastructure. Component-based technologies can take advantage of differing client platforms, diverse application environments and connectivity options.

An object of the present invention is to provide a system where organizations may re-use legacy application assets in a component-based framework.

Another object of the present invention is to provide a system that can represent legacy assets of an organization irrespective of the legacy application type.

Yet another object of the present invention is to provide a system that represents the legacy assets of an organization as specifications that can be used to generate components irrespective of the underlying middleware implementation.

Still another object of the present invention is to provide a method and system that permits an organization to associate a legacy-based specification to a component-based implementation, which would otherwise not be possible.

Another object of the present invention is to provide a system that permits an organization to achieve levels of information enabling, through model-based development, which would otherwise not be possible.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 4A through 4D combined form a class diagram of the system of the present invention as it depicts associations and relationships between various classes of legacy assets.

FIG. 6 is a print of a computer display screen after employment of the method of the present invention.

DETAILED DESCRIPTION OF ONE EMBODIMENT

Figure 1:
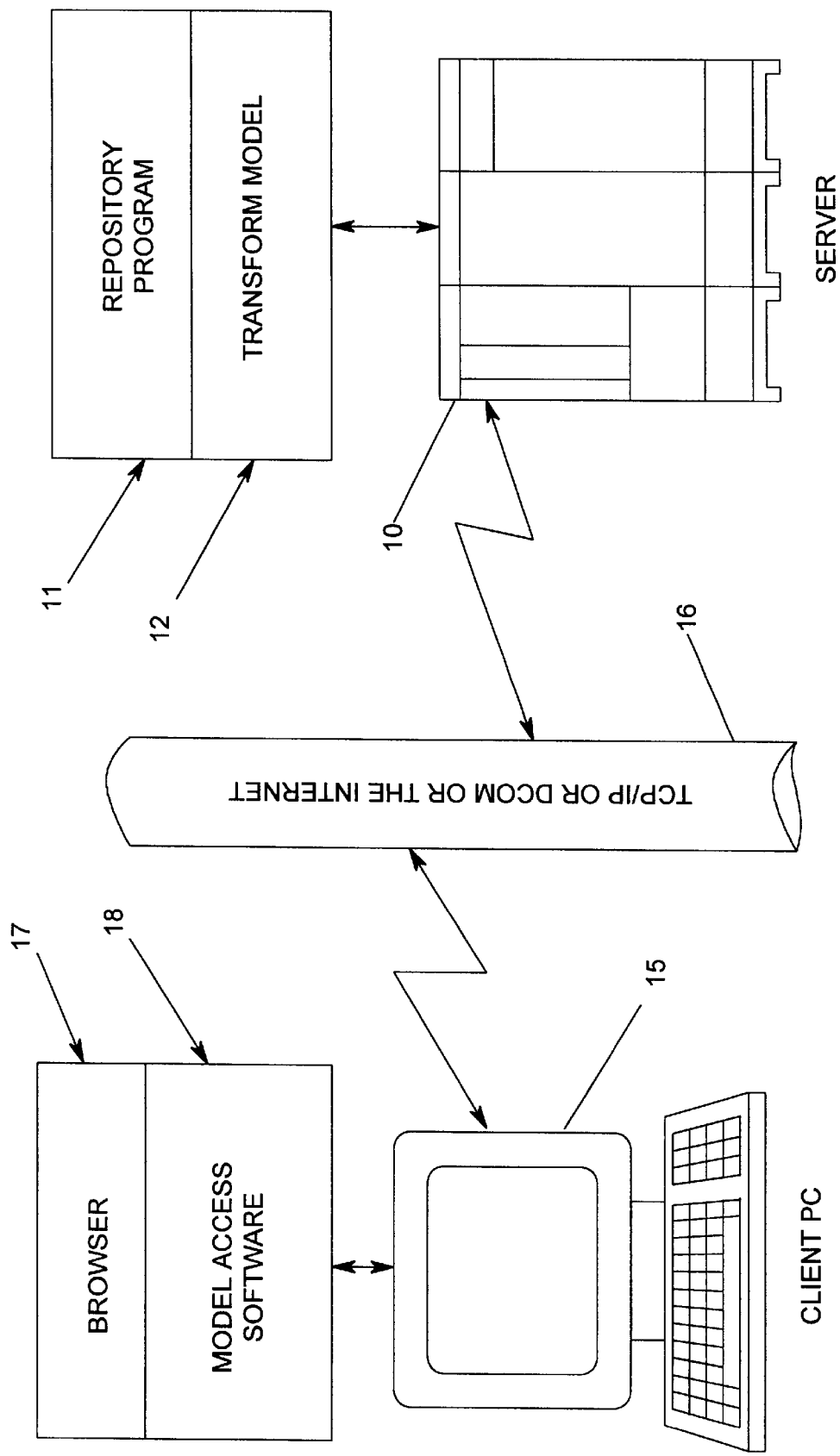
FIG. 1 is a block diagram of a computer system framework which may employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

Modeling the world as objects and then implementing them in an object-oriented system is the basis of object-oriented technology. Corporations are just beginning to apply the concepts of object technology to the business itself. Anything that is related to the finances, products, or customers of an enterprise can be a business object and work as part of a cooperative business object system. Business objects represent things, processes or events that are meaningful to the conduct of a business. Business objects make sense to business people. More specifically, a business object is a representation of an active thing in the business domain, including at least its business name and definition, attributes, behavior, relationships, rules, policies and constraints. Typical examples of business objects are an employee, a product, an invoice or payment receipt. Business objects do not have to be written in an object-oriented language.

An object represents the business object abstraction, which models the real world in the information system. Each such object in the information model is a component of that information model and must be supported by a technology infrastructure. The discovery phase is characterized by the capturing of source information. A unit of source information is characterized as containing enough information to allow it to be effectively modeled. Source information can include the screen input and output of legacy transactions, documents, data base records, etc.

One embodiment of the present invention makes use of the Component Object Model ("COM") and COM+, which were developed by Microsoft Corporation of Redmond, Wash. Though COM is a widely used technology that provides a binary standard for component interoperability, the functionality of the present invention may also be embodied in other technologies, such as JAVA e.g., which was developed by Sun Microsystems of Mountain View, Calif. Implementing a binary standard permits component development using many languages or tools. COM defines the rule-sets to make objects work together, regardless of where the objects are located.

COM objects communicate with each other and with client applications by using an interface. An interface is essentially a specification for some well-defined behavior. Any object that claims it supports a particular interface agrees to provide the specified behavior. A client that uses the interface doesn't need to worry about the specifics of how a particular object implements the interface; it just knows that the object provides the specified services. Objects can support any number of interfaces. Objects that support COM are called ActiveX components, or ActiveX controls.

Components that implement certain generic interfaces are referred to by special names. For example, components that implement the IDispatch interface are called Automation components. Automation components expose properties, methods, and events to client applications via IDispatch interfaces. Development tools can use this information at design time to determine what features a particular component exposes.

The present invention is designed to provide an application independent host-based legacy specification store that defines associations between the specifications in order to model and build business-centric applications in a technology independent manner. The system and method disclosed in the above-cited co-pending patent application provide all the tools and documentation necessary to store and retrieve legacy source information, associate independent of the underlying middleware technology, administer and execute those components to permit component-based client access to host-based applications on a computer system.

Referring now to FIG. 1, a system configuration is illustrated, including a server 10 executing programs, such as a repository program 11 and a transform model application program 12. The transform model application program 12 is a COM automation component that represents the associations between legacy assets or specifications stored in the repository 11.

In the disclosed embodiment, the repository program 11 is a specialized, extensible object-oriented database application that adds value to a database system, which allows customization of a particular domain (such as application development).

The repository program 11 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, now U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, now U.S. Pat. No. 6,018,627, for TOOL-INDEPENDENT APPLICATION DEVELOPMENT; and, pending application Ser. No. 08/934,834, filed on Sep. 22, 1997, now U.S. Pat. No. 6,038,393, for EXCHANGING INFORMATION BETWEEN DIFFERENT OBJECT MODELS AND UML; each of which are hereby incorporated by reference as if set forth in full herein.

The server 10 is coupled to a PC 15 by means of a TCP/IP 16, which may comprise any of several readily available proprietary protocols, or the Internet. The PC 15 is capable of executing software programs, such as a Browser 17 and a COM compliant transform model access program 18.

Figure 2:
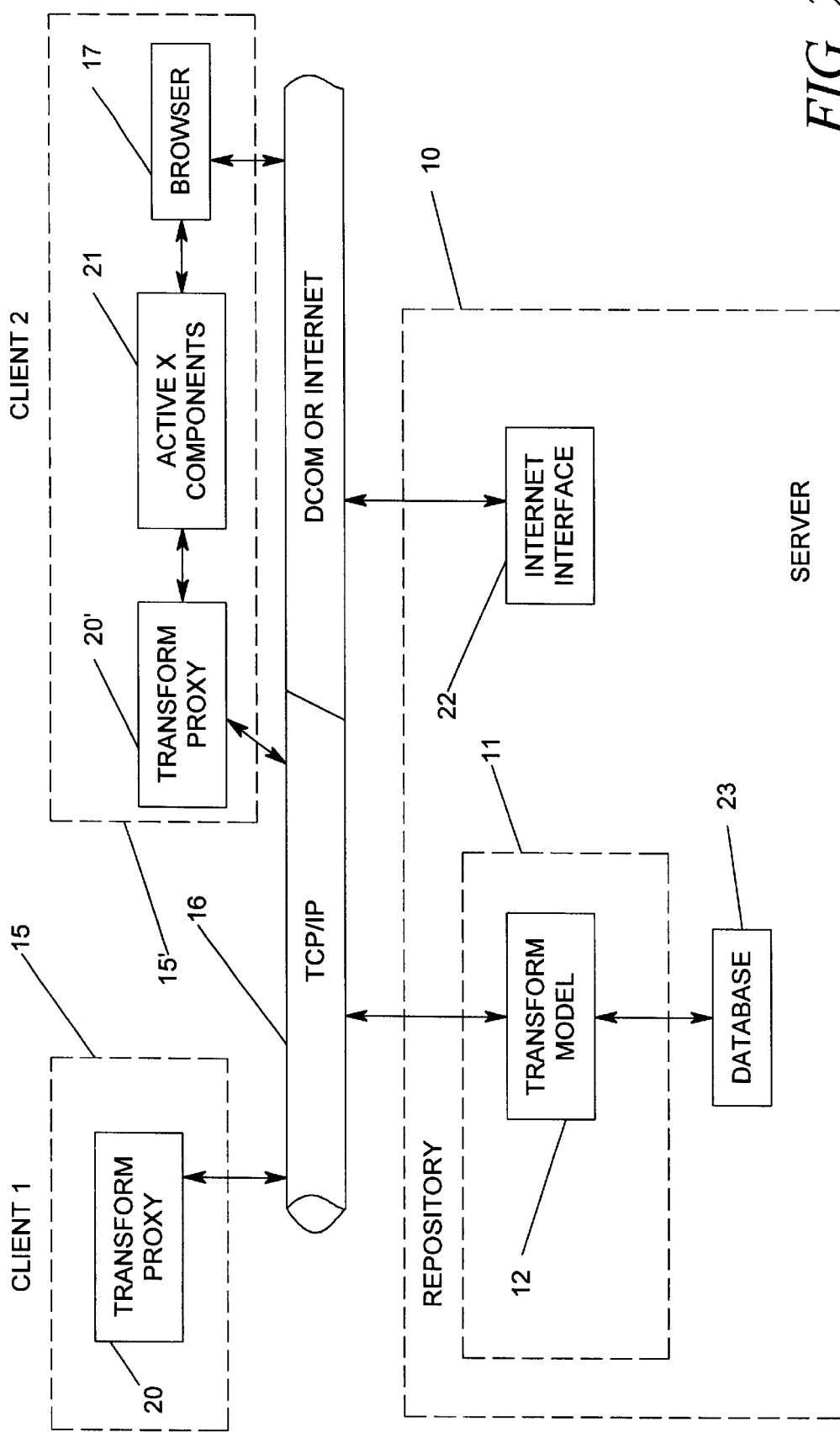
FIG. 2 is a software module block diagram of the method and system of a theoretical model of the present invention.

Referring now to FIG. 2, a block diagram of a software module block diagram of the method and system of a theoretical model of the present invention is shown. Various modules used for building and transforming assets on a host application into software components useful in developing business-centric applications are illustrated. Within the PC 15 (Client 1) is a transform proxy 20, which is a COM compliant component that provides the capability to access the transform model 12 over a distributed network using DCOM. The transform proxy 20 communicates directly with the TCP/IP 16, which in turn communicates directly with the transform model 12 within the repository program 11 being executed by the server 10.

An alternate arrangement of software within the PC 15, which is referred to in FIG. 2 as 15' (or Client 2), includes an ActiveX component 21 disposed between a transform proxy 20' and the Browser 17. The ActiveX component 21 calls the transform proxy 20' based on user input from the Browser 17. The transform proxy 20' communicates directly with DCOM, which uses the services of the TCP/IP 16, which in turn communicates directly with the transform model 12 within the repository program 11 being executed by the server 10. The Browser 17 communicates directly with the Internet 16. Within the repository server 10 an Internet Interface 22 that defines the references (in the form of an HyperText Markup Language page) to the ActiveX component 21'. A database 23 is accessible by the repository 11 for the storage and retrieval of host-based legacy data specifications. A typical database satisfactory for the database 23 is OSMOS, which is an object-oriented/relational database available from the assignee hereof.

Figure 3:
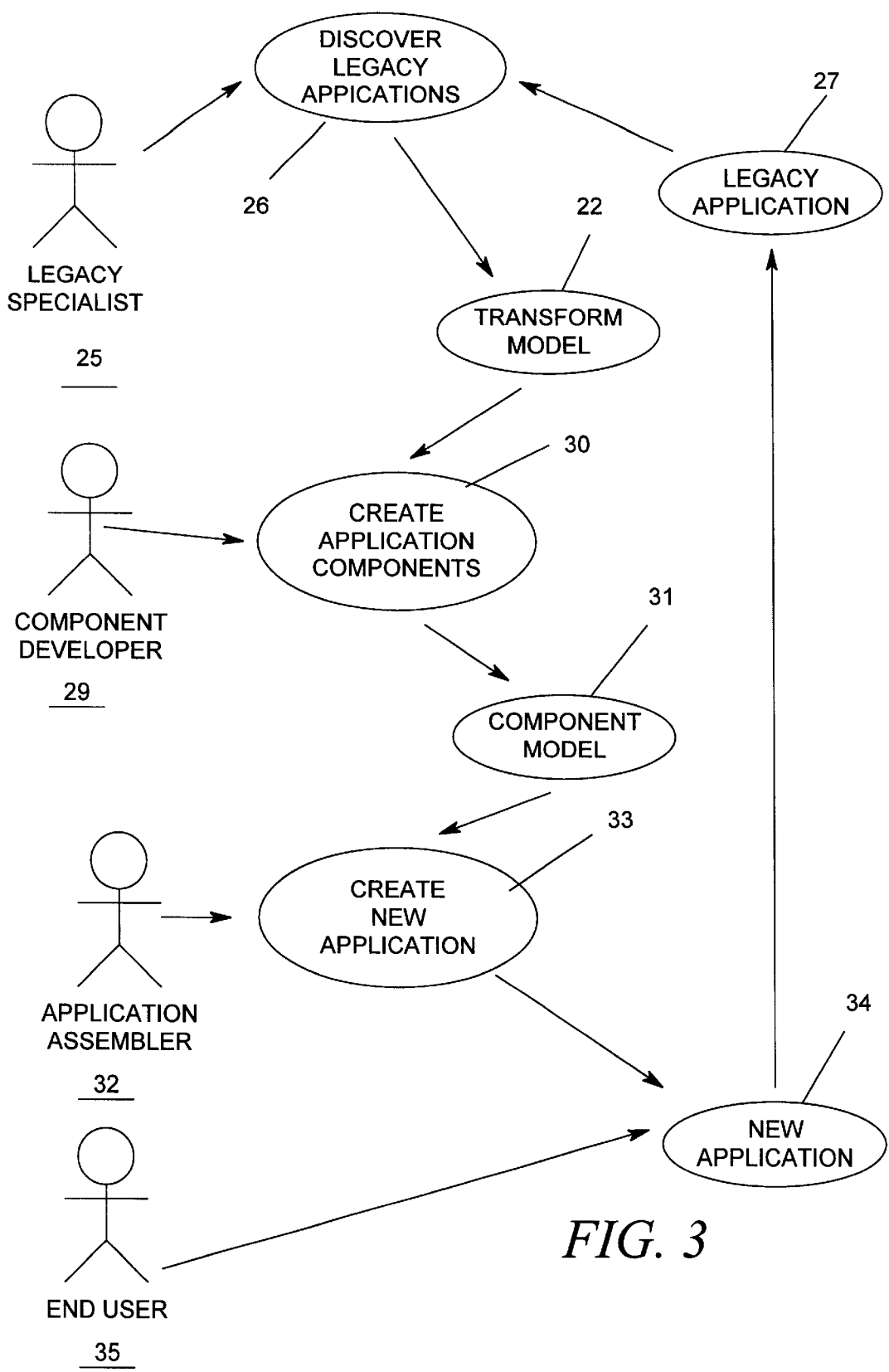
FIG. 3 is a use case diagram of the present invention.

Referring now to FIG. 3, a use case diagram of the present invention is shown. The first act to be performed is by a legacy specialist 25, who discovers 26 a legacy application 27 by use of the process disclosed in the above-cited co-pending application. The result of the discovery operation 26 stores discovered legacy assets in the transform model 12 in accordance with the present invention. A component developer 29 uses the stored legacy assets from the transform model 12 to create application components 30, which in turn are stored and associated with the discovered legacy asset in the transform model 12.

An application assembler 32 uses the components stored in the transform model 12 to create 33 a new application 34.

The new application 34 is run in parallel with the legacy application 27 by an end user 35. Accordingly, the legacy application 27 may be re-used in a component-based framework, such as the new application 34. As will be shown in greater detail hereinbelow, a method and system is provided that includes an iterative process for building and deploying components as illustrated in FIG. 3. Such a method and system allows the delivery of information to large numbers of end-users without configuring every end-user system with application-specific client applications.

Figure 4A:
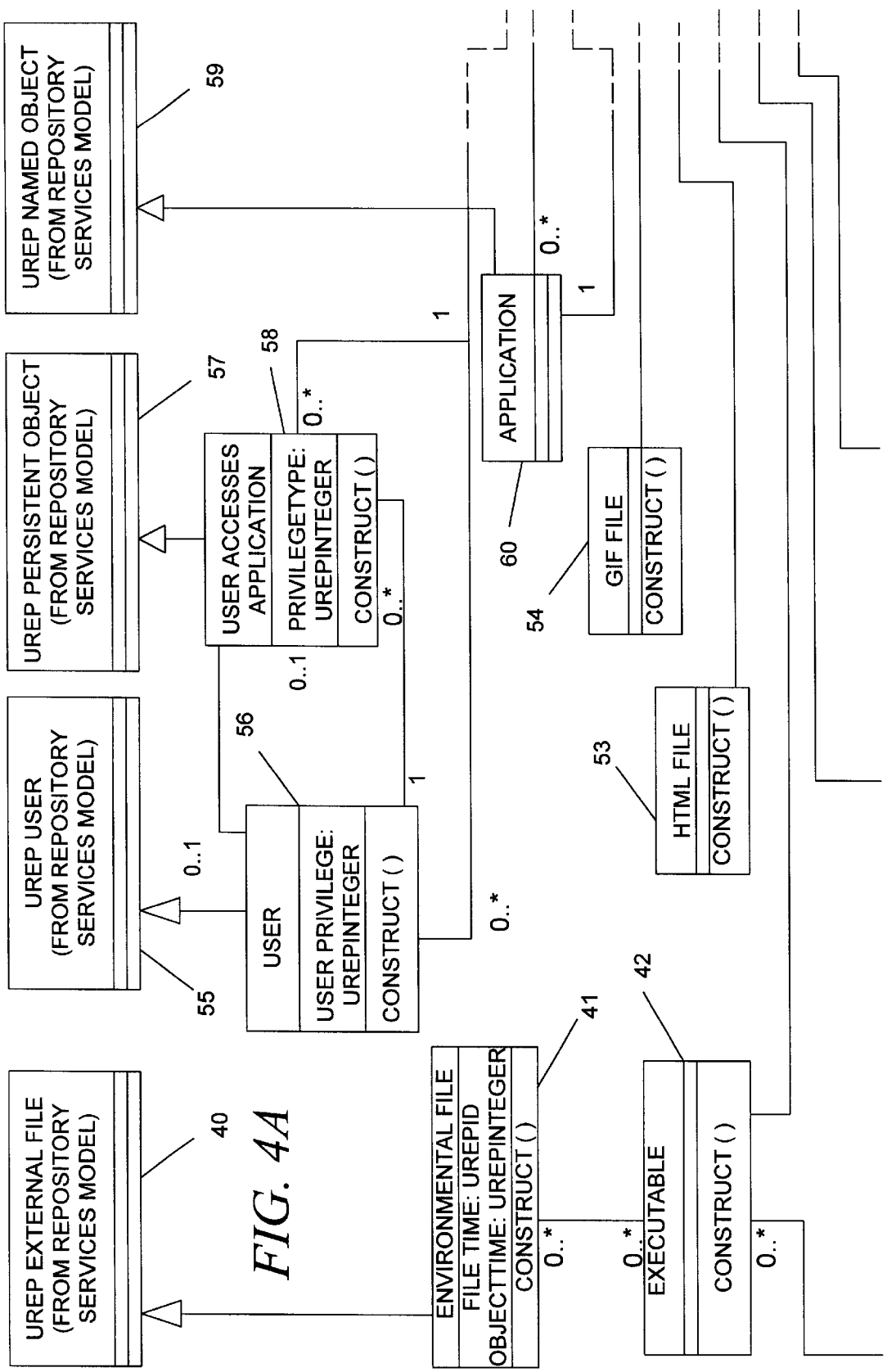
Figure 4C:
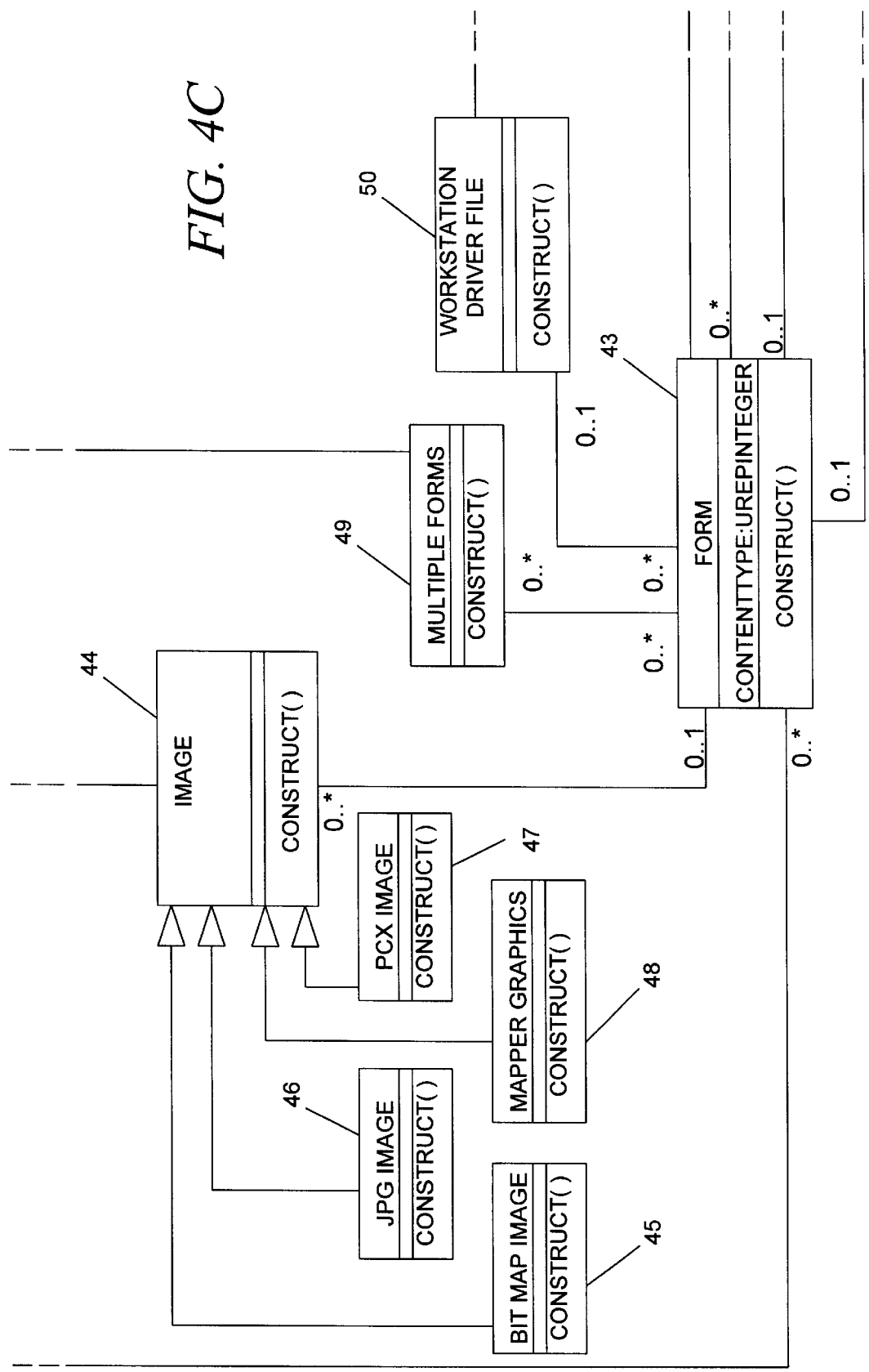
Figure 4D:
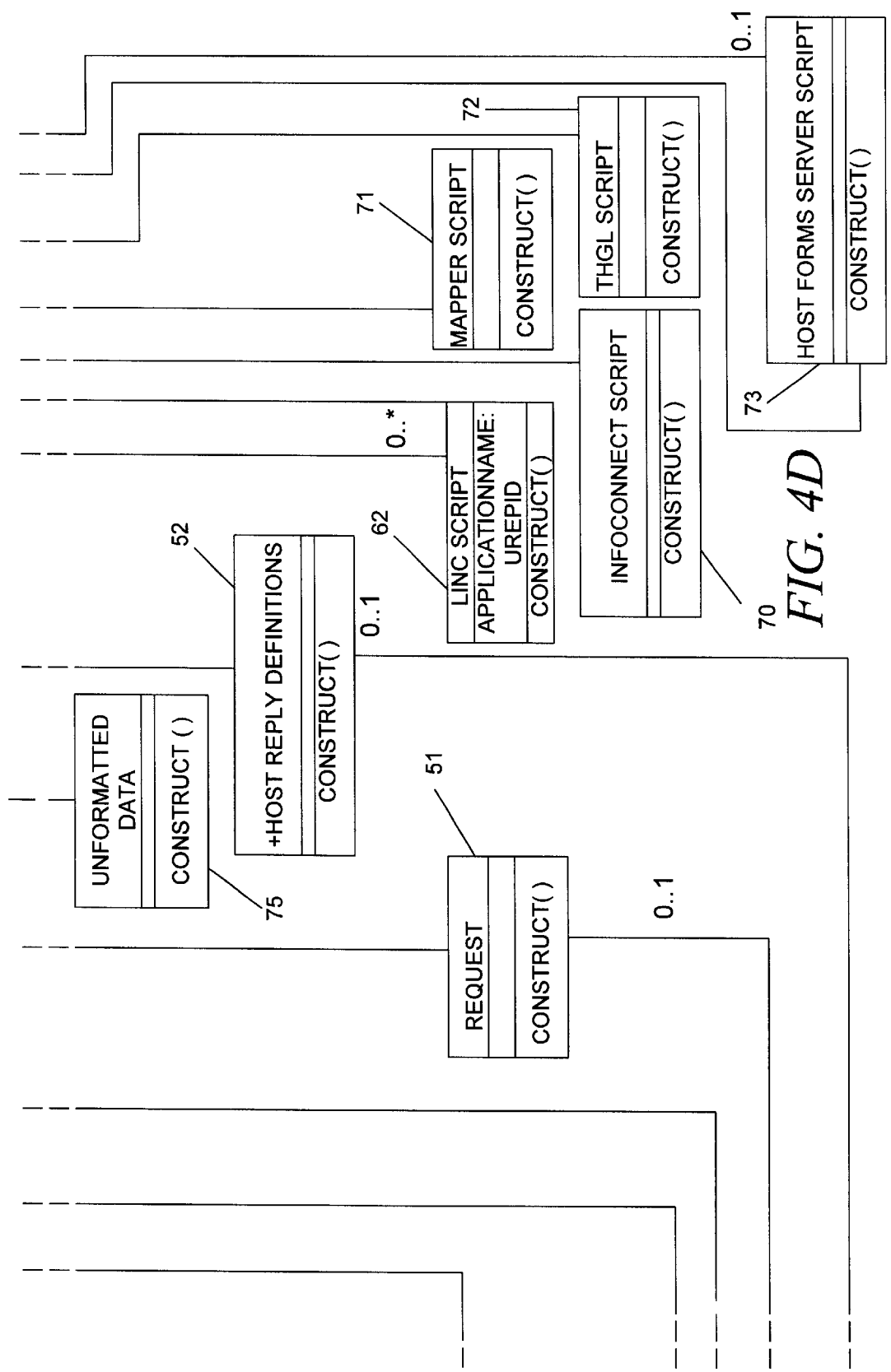

Referring now to FIG. 4, a unitary diagram illustrates the orientation of the next four sheets of drawings. When FIGS. 4A through 4D are laid out in accordance with the FIG. 4 orientation, a complete class diagram illustrating the present invention is shown. This class diagram illustrates the transform model 12, which in one embodiment is implemented in UML. Following discovery of a legacy program by use of the tool described in the above-cited co-pending application, the discovered objects are transformed into repository objects (by the aforementioned discovery tool) in accordance with the transform model 12. The repository objects are then stored in the repository 11.

The conventions used in FIGS. 4A through 4D are those commonly used for UML class diagrams. This class diagram shows objects in the transform model 12 and the static relationships of those objects. A rectangular box represents a class of objects, which is sub-divided into three regions. In the top region is inserted the name of the class; in the middle region is inserted any attributes specific to that class; and, in the bottom region is inserted any methods performed by that class. Associations between classes are illustrated in simple solid lines. Optional arrowheads may be added to the lines to show which class sends messages to the other or causes the other to take action. Also, the association lines may be annotated with numbers at the ends to show cardinality, such as a one-to-one or many-to-many relationship. The UML syntax uses a two-dot ellipsis to denote a range and an asterisk is used to denote "many"; thus, the range 1 to 8 is written "1..8" and a one-or-more is written "1..*".

Referring now to FIGS. 4A through 4D, a class diagram for a theoretical model of the present invention is shown. A UREP External File class 40 is available in the Repository Services Model, which is a part of the Universal Repository product ("UREP") available form the assignee hereof. The UREP External File class 40 is a generalization of an Environmental File class 41. The Environmental File class 41 represents a file in the local file storage system, which is associated with a Executable class 42. The Environmental File class 41 has attributes fileTime, which is the time of the last modification to the external file; objectTime, which stores the time of the last modification of this object and envUsedByExe, which consists of a set of executable processes that use the Environmental File. The Environmental File class 41 may invoke the method construct, which constructs a new Environmental File object.

The Executable class 42 represents a file that contains an executable process image, which includes the attributes exeUsesEnv that contains the set of Environmental Files used by this Executable and exeUsesForm, which contains the set Forms used by the same. The Executable class 42 may invoke a method "construct", which constructs a new Executable object. 0 or more Executables may be associated with 0 or more Environmental Files. The Executable class 42 is also associated with the Form class 43. The Form class 43 represents the file that contains a method for the user to input and output data using a terminal. It includes the attributes contentType, which defines whether the Form is an SCL, PB, VB or EXE form; defaultMulOrExe, which defines the default MultiplierForm, or Executable object, for this Form; formUsedByExe; which defines the set of Executable objects that use this Form; formUsedByMul, which defines the set of MultiplteForms objects that use this Form; formUsesData, which defines the set of UnformattedData objects that use this Form; formUsesHrd, which defines the HRD this Form uses; formUsesImage, which defines the set of Images this Form uses; formUsesRequest, which defines the Request file this Form uses and formUsesWdf, which defines the Workstation Driver File the Form class 43 uses.

The Form class 43 may invoke the method construct, which constructs a new Form object. 0 to many instances of the object Form is associated with 0 to many instances of the object Executable. An Image class 44 stores an Image file, which includes the attribute imageUsedByFormthat defines the Form that uses this Image. The Image class 44 may invoke a method "construct", which constructs a new Image object. 0 or many Image objects are associated with 0 or many Form objects. The Image class 44 is also a generalization of four objects Bit map Image 45, JPG Image 46, PCX Image 47 and Mapper Graphics 48. All of these four objects may invoke the method "construct", which constructs a new object for their respective types. A Multiple Forms class 49 represents a file that stores multiple Forms. It includes the attribute mulUsesForm, which defines the set of Forms the Multiple Form class 49 uses. It may also invoke the method "construct", which constructs a new Multiple Form object.

A Workstation Driver File ("WDF") class 50 represents the definition of the request and reply fields of a Unisys LINC transaction. It includes an attribute WDFUsedByForm, which represents the set of Forms that use the Workstation Driver File class 50. The Workstation Driver File class 50 may also invoke a method "construct", which constructs a new Workstation Driver File object. 0 or one Workstation Driver File objects are associated with 0 or many Form objects. A Request class 51 stores a request file and includes the attribute requestUsedByForm, which specifies the Form that uses this Request file. The Request class 51 may also invoke a method "construct", which constructs a new Request object. 0 or one Request objects can be associated with 0 or one Form objects.

A Host Reply Definitions class 52 represents the host reply definitions (HRD) file, which includes an attribute hrdUsedByForm that specifies the Form that uses this HRD file. The Host Reply Definitions class 52 may also invoke a method "construct", which constructs a new Host Reply Definitions object. 0 or one instances of the Host Reply Definitions object may be associated with 0 or one Form objects. An Html File class 53 and a Gif File class 54 represent an html file and a gif file, respectively. Both of these classes can invoke a method "construct", which constructs an object for the respective file types.

A UREP User class 55 is available in the Repository Services Model of the same Universal Repository product ("UREP"). The UREP User class 55 is a generalization of a User class 56. The User class 56 represents a UREP User who has access to TransForm objects. This class includes the attributes accessesApplication, which specifies the set of objects providing access to Applications for this User; default Application, which provides access to default Application of this User; userCanUseScript, which specifies the set of scripts this User can use and userprivilege, which defines the initial login privilege of this User. The User class may also invoke a method "construct" which constructs a new User object.

A UREP Persistent Object class 57 is available in the Repository Services Model, which is a part of the same UREP product. The UREP Persistent Object class 57 is a generalization of a User Accesses Application class 58. The User Accesses Application class 58 represents the privilege level that a particular User has to a particular Application and includes the attributes application, which specifies the Application to which access is described; defaultApplicationForUser, which describes the default Application for the User; privilegeType, which specifies the privilege level the User has to the Application and user, which specifies the User for which access is described. The User Accesses Application class 58 may also invoke a method "construct", which constructs a new User Accesses Application object. 0 to many instances of the User Accesses Application class 58 can be associated with 0 to many instances of the User class 56.

A UREP Named Object class 59 is available in the same Repository Services Model, UREP product. The UREP Named Object class 59 is a generalization of a Application class 60. The Application class 60 provides a conceptual partitioning of a Common File class 61. Each instance of the Common File 61 class belongs to one and only one Application. The Application class 60 includes the attributes accessedByUser, which specifies the set of Users that have access to this Application; applicationHasFile, which specifies the set of Common Files that belong to this Application and applicationHasLincScript, which specifies the set of LINC Scripts class 62 that provide a host connection for this Application. The Application class 60 may invoke a method "construct", which constructs a new Application object. One instance of the Application class 60 may be associated with 0 to many instances of the User Accesses Application class 58.

The Common File class 61 is a generalization of the classes Gif File 54, Html File 53, Executable 42, Image 44, Multiple Forms 49, Workstation Driver File 50, Form 43, Request 51 and Host Reply Definitions 52. The common File class 61 represents a Database File 65 that belongs to one and only one Application. The Database File class 65 includes the attributes, applicationName, which specifies the name of the Application associated with an instantiation of this class; applicationType, which specifies the type of development environment application that created this Common File; designerTimeStamp, which specifies the last time the CommonFile 61 was modified in the development environment; fileHasApplication, which specifies the one and only Application to which this Common File belongs; globalTimeStamp, which specifies the last time the Common File was modified in the run time environment and defaultMulOrExeForForm, which specifies the set of forms that have this as the default Multiple Form or Executable. The Common File class 61 may invoke a method "construct", which constructs a new Common File object. 0 to many instances of the Common File class 61 can be associated with one instance of the Application class 60.

A UREP Internal File class 67 is available in the same Repository Services Model UREP product. The UREP Internal File class 67 is a generalization of the Database File class 65. The Database File class 65 is a generalization of the classes Common File 61, Master Script Template 68 and User Profile Script 69; and, is a base class of all TransForm classes derived from the UREP Internal File 67. It includes the attribute extension, which specifies the local file name extension and may invoke a method "construct", which constructs a new Database File object. The Master Script Template class 68 represents the template on which an actual User Profile Script class 69 is based. It may invoke a method "construct", which constructs a new Master Script Template object.

The user Profile Script class 69 represents the description of a connection to a host application. It is a generalization of the classes LINC Script 62, Info Connect Script 70, Mapper Script 71, Three Gl Script 72 and Host Forms Server Script 73. It includes the attributes associatedHostForms, which specifies the associated Host Forms Server Script; businessSegment, which specifies the business segment to which an instantiation of the class belongs to; configuration, which specifies the various parameters used by the script; infoConnectPathName, which specifies the associated Info-ConnectScript; ipAddress, which specifies the IP address of the host; pathA, pathB and pathC, each of which specify a particular path associated with the connection; portnumber, which specifies the port number to which a connection is instantiated; scriptUsableByUser, which specifies the set of Users that can use this script and timeStamp, which specifies a time of last modification of the script. The UserProfile-ScriptType may invoke the methods "construct", which constructs a new UserProfileScript object; "getConfiguration", which gets and decrypts the configuration attribute of the script and "setConfiguration", which encrypts and sets the configuration attribute of the script. 0 to many instances of the class UserProfileScript can be associated with 0 to many instances of the class User.

The LINC Script class 62 represents a host connection script for LINC systems. It includes the attributes applicationName, which specifies the associated LINC application name and lincScriptHasApplication, which specifies the associated LINC Application object. It may also invoke a method "construct", which constructs a new instance of the class LINCScript. 0 to many instances of the class LINC Script may be associated with 0 to many instances of the class Application. The Info Connect Script class 70 represents a host connection script for an INFO-Connect connection. It may invoke a method "construct", which constructs a new Info Connect Script object. The Mapper Script class 71 represents a host connection for a MAPPER system. It may invoke a method "construct" which constructs a new MapperScript object. The ThGl Script class 72 represents a host connection script for 3 GL systems. It may invoke a method "construct", which constructs a new ThGl Script object. The Host Forms Server Script class 73 represents a connection script for a host forms server. It includes the attribute associatedapplication, which specifies the connection script for an associated host application and may invoke a method "construct", which constructs a new Host Form Server Script object.

An Unformatted Data class 75, which is a catch-all class for data storage, is a subclass of the Common File class 61 (FIG. 4B). The Unformatted Data class 75 is a general purpose file class for storage of data of any kind. It includes the attribute dataUsedByForm, which specifies the set of Forms that use this file. It may invoke a method "construct", which constructs a new UnformattedData object.

Figure 5:
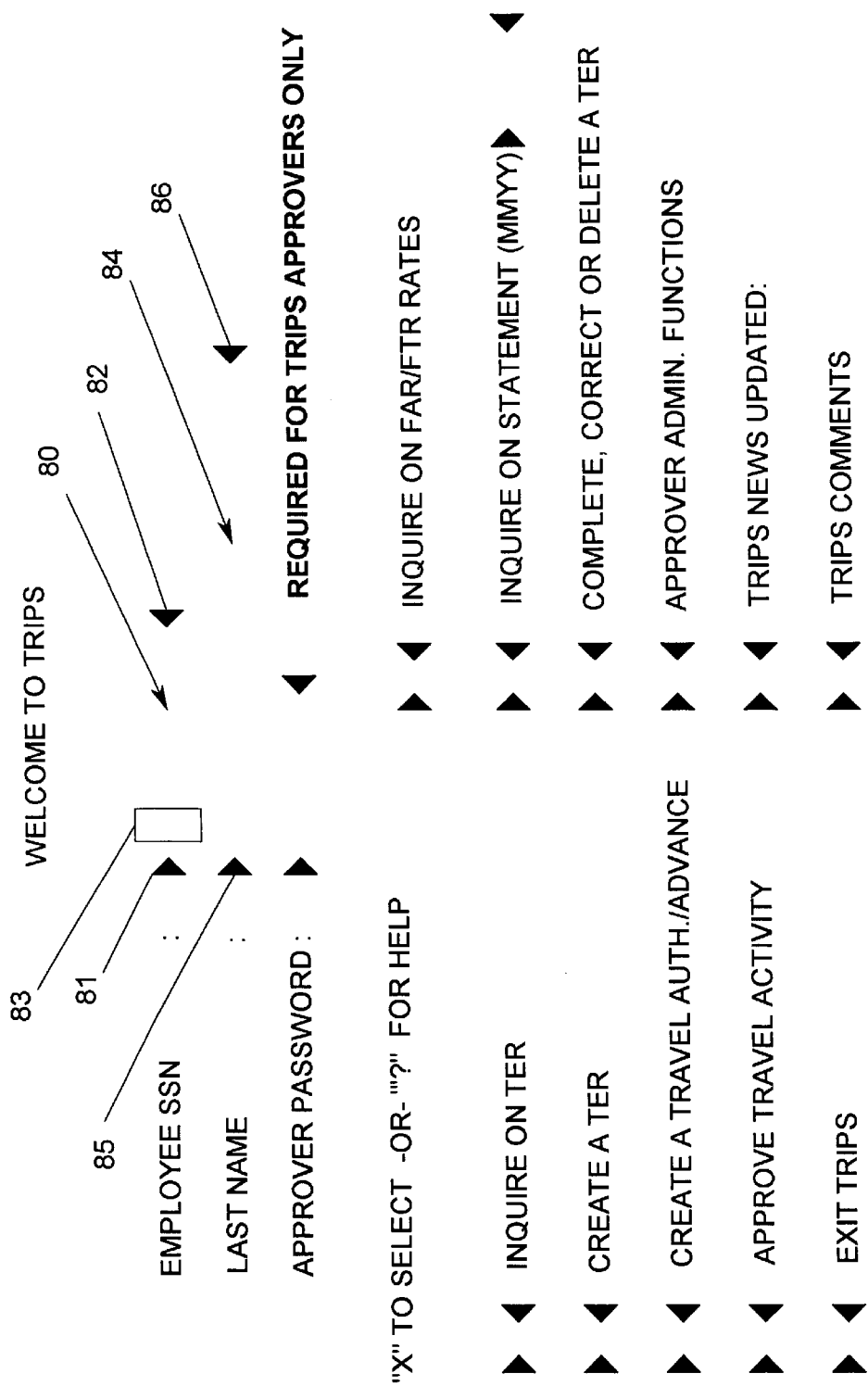
FIG. 5 is a print of a computer screen from a 3GL host-based legacy application form for TRIPS, a report for tracking employee expenses, which is convertible by using the method of the present invention.

Referring now to FIG. 5, a print of a screen display of host based legacy application is illustrated. When a client logs onto the server and specifies TRAVEL, this particular screen entitled TRIPS appears on the screen. It is a typical Form to be completed by an employee of an organization for reimbursement of travel expenses. Each field of this Form is depicted by a space between opposing arrowheads. For example, the field entitled EMPLOYEE SSN is that space 80 between opposing arrowheads 81 and 82, and includes a display screen cursor 83. The next field LAST NAME is that space 84 between opposing arrowheads 85 and 86. The remaining fields of the Form are similarly depicted. There are a total of fifteen (15) fields on this Form.

Referring now to FIG. 6 a print illustrates a computer screen display of a business-centric version of the 3GL Form shown in FIG. 5 and described hereinabove. Notice that this Form includes windows for entering data, wherein window 80 corresponds to the space 80 in FIG. 2 for entry of an Employee SOS. Window 84 corresponds to the space 84 in FIG. 4. A TRANSMIT button 88 is added by the business-centric application development process.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer system having data contained in a plurality of objects described by a model representing host-based application assets, said model being disposed for use in the development of business-centric applications, said computer system comprising:
   a. data storage means for storing said plurality of objects in said computer system;
   b. means for populating said plurality of objects with a specification for a particular host-based asset;
   c. wherein said model comprises a hierarchy of classes defined for said computer system, including a database file class encapsulating a generalization of all persistent host-related data.

2. The computer system as in claim 1 wherein said model further comprises a common file class encapsulating a generalization of all host-based assets that belong to an application type.

3. The computer system as in claim 2 wherein said common file class further includes:
   1) an executable class representing a file that contains an executable process image;
   2) an environmental file class representing a file in said data storage means associated with said executable class;
   3) a form class representing a method for a user to input and output data using a terminal; and,
   4) an unformatted data class representing a general purpose file class for data storage.

4. The system as in claim 1 wherein said database file class further includes:
   1) a user profile script representing a description of a connection to a host application; and,
   2) a master script template representing a template on which an actual one of said user profile scripts is based.

5. The system as in claim 1 wherein said model further comprises:
   1) a user class representing properties unique to a particular user;
   2) a user access application class representing a privilege level that a user has to a particular application; and
   3) an application class encapsulating a list of host-based assets and a list of users who have access to those assets.

6. A computer system having data contained in a plurality of objects described by a model representing host-based application assets, said model being disposed for use in the development of business-centric applications, said computer system comprising:
   a. data storage means for storing said plurality of objects in said computer system;
   b. means for populating said plurality of objects with a specification for a particular host-based asset;
   c. wherein said model comprises a hierarchy of classes defined for said computer system, including:
      1) a common file class encapsulating a generalization of all host-based assets that belong to an application type; and,
      2) a database file class encapsulating a generalization of all persistent host-related data.

7. The system as in claim 6 wherein said model further comprises:
   3) a user class representing properties unique to a particular user;
   4) a user access application class representing a privilege level that a user has to a particular application; and,
   5) an application class encapsulating a list of host-based assets and a list of users who have access to those assets.

8. The system as in claim 6 wherein said common file further includes:
   3) an executable class representing a file that contains an executable process image;
   4) an environmental file class representing a file in said data storage means associated with said executable class;
   5) a form class representing a method for a user to input and output data using a terminal; and,
   6) an unformatted data class representing a general purpose file class for data storage.

9. The system as in claim 6 wherein said model further includes:
   3) a request class encapsulating a request file including attributes that specify the form that uses this file.

10. The system as in claim 6 wherein said model further includes:
    3) a multiple forms class representing a file that stores multiple forms and including an attribute that defines the set of forms this class uses.

11. The system as in claim 6 wherein said model further includes:
    3) an image class encapsulating an image file and including an attribute defining the form that uses this image.

12. The system as in claim 6 wherein said model further includes:
   3) a host reply definition class representing a host definition file and including an attribute that specifies the form that uses this file.

13. The system as in claim 6 wherein said model further includes:
   3) a workstation driver file class representing the definition of request and reply fields and including an attribute that represents the set of forms that uses this file.

14. A computer system having data contained in a plurality of objects described by a model representing host-based application assets, said model being disposed for use in the development of business-centric applications, said computer system comprising:
   a. data storage means for storing said plurality of objects in said computer system;
   b. means for populating said plurality of objects with a specification for a particular host-based asset;
   c. wherein said model comprises a hierarchy of classes defined for said computer system, including:
      1) a user class representing properties unique to a particular user;
      2) a user access application class representing a privilege level that a user has to a particular application;
      3) an application class encapsulating a list of host-based assets and a list of users who have access to those assets;
      4) a common file class encapsulating a generalization of all host-based assets that belong to an application type; and,
      5) a database file class encapsulating a generalization of all persistent host-related data.

15. The computer system as in claim 14 wherein said common file class further includes:
   6) a user profile script class representing a description of a connection to said hostbased application;
   7) an executable class representing a file that contains an executable process image;
   8) an environmental file class representing a file in said data storage means associated with said executable class;
   9) a form class representing a method for a user to input and output data using a terminal; and,
   10) an unformatted data class representing a general purpose file class for data storage.

16. The system as in claim 14 wherein said database file class further includes:
   11) a user profile script representing a description of a connection to a host application; and,
   12) a master script template representing a template on which an actual one of said user profile scripts is based.

17. A storage medium encoded with machine-readable computer program code for use with a computer system having data contained in a plurality of objects organized into a model representing host-based application assets, said model being disposed for use in the development of business-centric applications, comprising:
   a. means for causing said computer system to store said plurality of objects in a data storage means coupled to said computer system;
   b. means for populating said plurality of objects with a specification for a particular host-based asset;
   c. wherein said model comprises a hierarchy of classes defined for said computer system, including:
      1) a common file class encapsulating a generalization of all host-related data that belong to an application type; and,
      2) a database file class encapsulating a generalization of all persistent host-based assets.

18. A storage medium as in claim 17 wherein said model further comprises:
   3) a user class representing properties unique to a particular user;
   4) a user access application class representing a privilege level that a user has to a particular application; and,
   5) an application class encapsulating a list of host-based assets and a list of users who have access to those assets.

* * * * *